March 22, 1949.  F. A. RYDER  2,465,276
MAGNETIC MOLD
Filed Feb. 25, 1948  2 Sheets-Sheet 1
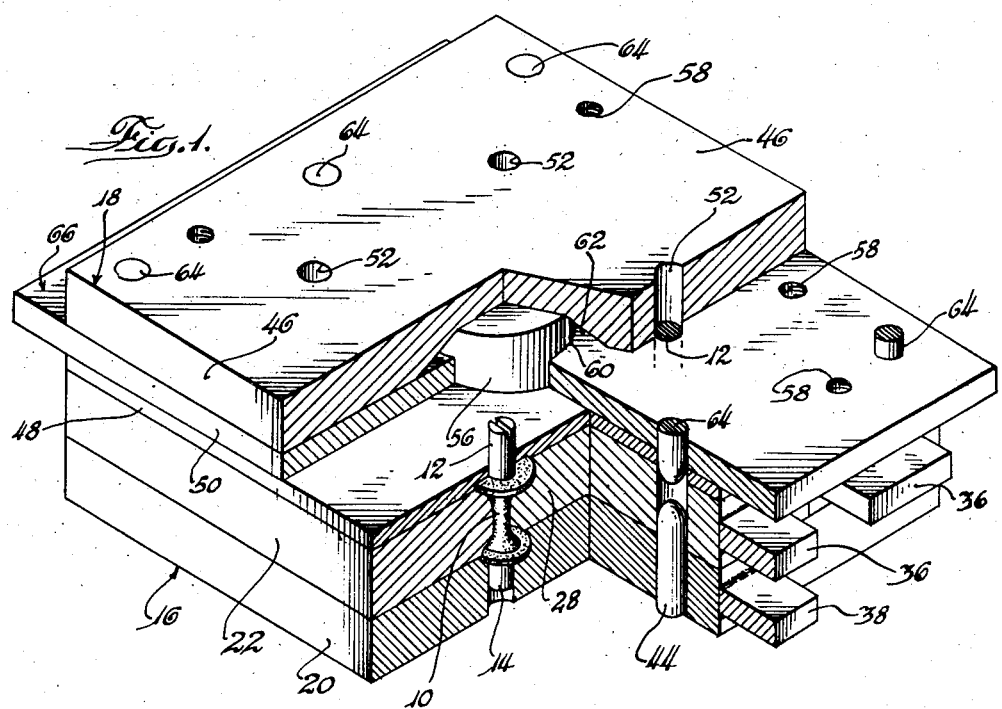
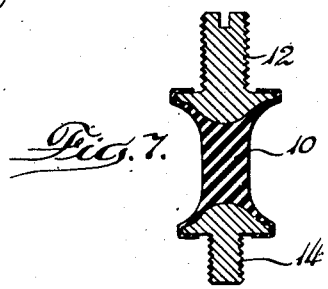
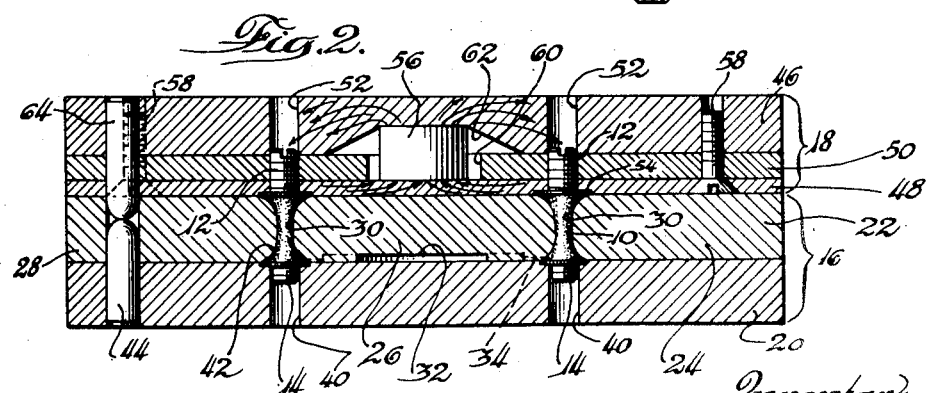
Inventor:
Frank A. Ryder
By Hinkel, Horton, Akelberg, Lunemann & Wupper
Attorneys.

March 22, 1949. F. A. RYDER 2,465,276
MAGNETIC MOLD
Filed Feb. 25, 1948 2 Sheets-Sheet 2
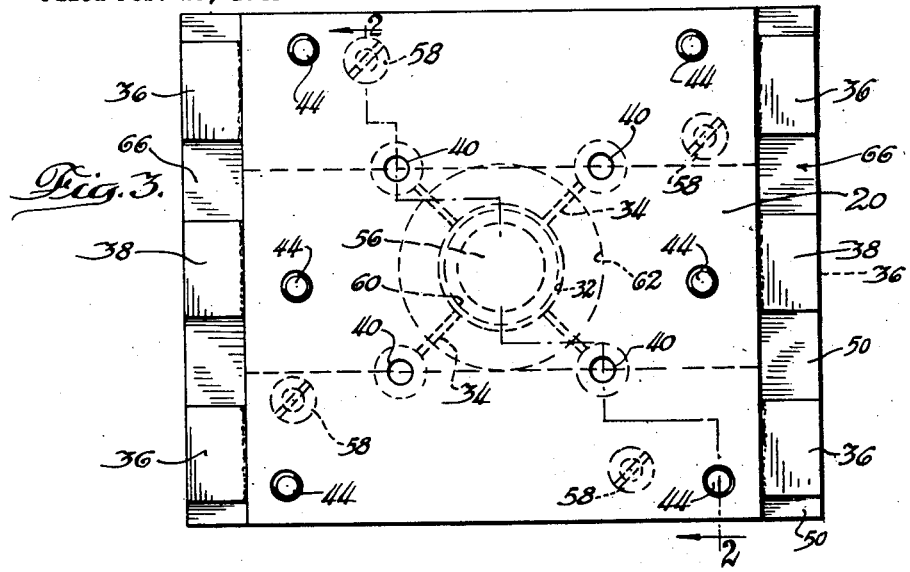
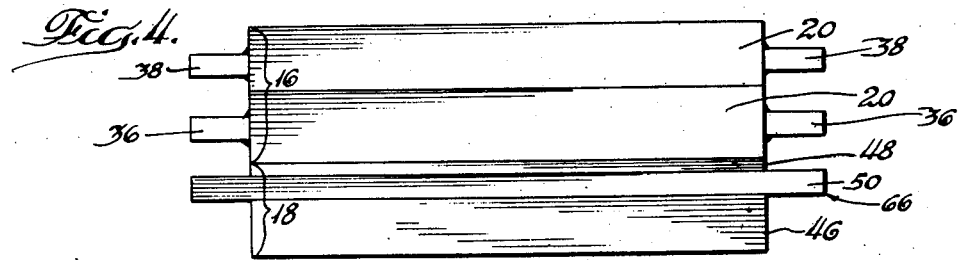
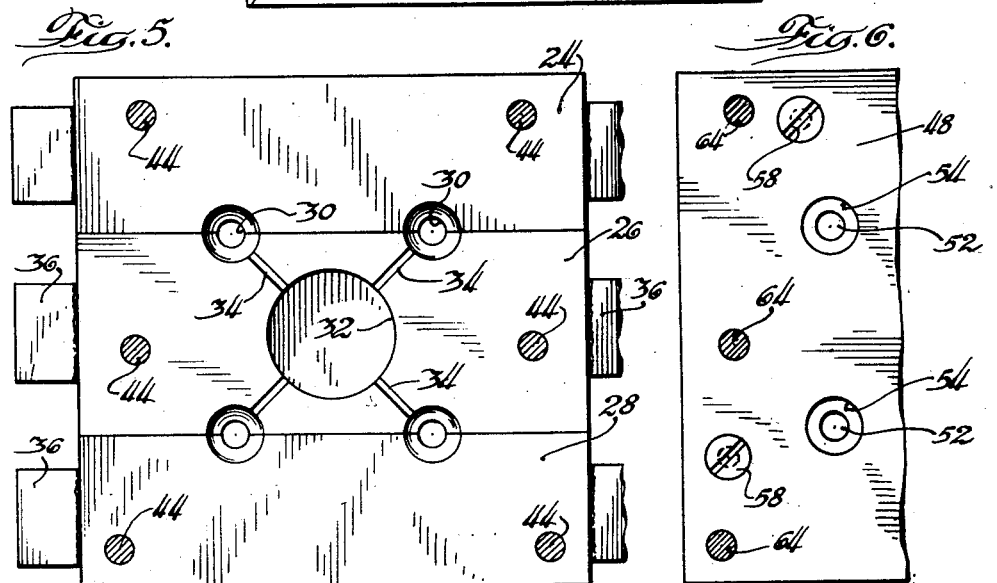
Inventor
Frank A. Ryder Patented Mar. 22, 1949

2,465,276

UNITED STATES PATENT OFFICE 2,465,276

MAGNETIC MOLD

Frank A. Ryder, Indianapolis, Ind., assignor to Stewart-Warner Corporation, Chicago, Ill., a corporation of Virginia Application February 25, 1948, Serial No. 10,620

11 Claims. (Cl. 18—42)

1

The present invention relates to mold or die forms for use in molding plastic material while bonding it to steel or iron insets, and more particularly to a mold of this type having a novel arrangement for holding the insets in position while the mold form is being assembled and during a molding or bonding operation.

In the mold or die forms presently used for molding or bonding rubber or other plastic articles which have separate insets bonded to the finished article, it is necessary to use mechanical holding or clamping devices to hold the insets in position during the necessary handling of the parts of the mold form when it is being assembled or while the processing is taking place. For example, when the insets must be carried in the top or cope section of the mold form, some means must be provided to hold them in position while this top section is being assembled to the bottom section. The mechanical means heretofore used for this purpose are not entirely satisfactory because they complicate the molding or bonding operation and add to the expense, not only because of their original cost, but also because of the fact that their use complicates a molding or bonding operation, thereby requiring more time and labor. The mold or die form of the present invention obviates these disadvantages by eliminating the need for mechanical holding or clamping devices.

Accordingly a primary object of the invention is the provision of a new and improved mold form for use in molding articles having insets of steel or the like bonded thereto in which the need for mechanical means for clamping or holding the insets during the assembly of the mold form or during the processing operation is eliminated and magnetic means are utilized to hold the insets in position in the mold form.

Another object of the invention is the provision in a mold form, for use in the multiple production of molded articles which have insets bonded thereto, of magnetic means for holding the insets in position while the mold is being assembled, and during the processing operations, which may be readily incorporated in a mold form without greatly altering the present design of such forms.

A further object of the invention is the provision of a new and improved mold or die form for use in forming articles having insets of magnetic material bonded thereto in which a permanent magnet is carried in the upper or cope section between oppositely spaced magnetic body members incorporated therein for establishing a magnetic potential between the opposite body

2 members; and guide means for positioning the insets are provided which consists of apertures extending through the magnetic body members so that the insets positioned therein complete a magnetic circuit between the body members and are thus held in position.

A still further object of the invention is the provision of a mold form for use in the multiple production of molded articles having insets bonded thereto, which has magnetic means for holding the insets positioned during a molding or bonding operation, and which is inexpensive to construct and is not affected by the degree of heat required in a molding or bonding operation so that it may be used for long periods of time.

Another object of the invention is the provision of a novel magnetic holding means as aforementioned which is equally adaptable for use in molds or dies.

Still another object is the provision of a novel mold for forming rubber type shock mounts.

These and other objects, advantages and capabilities of the invention will become apparent from the following description wherein reference is made to the accompanying drawings, in which:

Fig. 1 is a perspective view, partly in section, of the complete mold form incorporating the principles of the present invention;

Fig. 2 is an irregular vertical section taken on the line 2—2 of Fig. 3;

Fig. 3 is a bottom plan view of the mold form of the present invention;

Fig. 4 is an end elevation of the mold form in inverted position;

Fig. 5 is a bottom plan view of the intermediate or cheek section of the mold form shown in Fig. 1;

Fig. 6 is a fragmentary plan view of the underside of the top or cope section of the mold form shown in Fig. 1; and Fig. 7 is a longitudinal sectional view of a shock mount of the type which may be made in the mold form illustrated, and which includes a resilient molded rubber-like intermediate part, to each end of which is bonded a threaded steel stud.

In order to illustrate the principles of the invention, there is disclosed in the drawings, and now will be described, a relatively small mold form for producing shock mounts. A cross-section of one of these mounts is shown in Fig. 7 from which it will be seen that they include an intermediate part 10 of soft rubber or synthetic rubber-like material, to each end of which is bonded a threaded steel stud, these studs being numbered 12 and 14. Shock mounts of this type are used in large numbers where it is desired to secure operating parts such as motors or motor operated parts, to fixed frames, and to eliminate or reduce vibration and noise resulting from the operation of the motor or part. One of the threaded ends of the shock mounts used in such an installation is secured in the motor frame or housing while the other end is threaded or otherwise fixed to the fixed frame so that the vibration or noise caused by operation of the motor or other part is largely absorbed or dissipated in the intermediate body portions 10 of the shock mounts.

In the drawings there is shown a mold form adaptable for making four shock mounts of this type at one time. This is intended merely as an example. In practice, the mold forms generally will be of much larger size; for example, they may be capable of producing as many as 144 shock mounts in one operation.

The mold form is of sectional construction and includes a base or drag section and an upper or cope section which are indicated in their entirety in Figs. 1, 2 and 4 by the numbers 16 and 18, respectively. The drag section 16 is of more or less conventional construction and includes a metallic base plate 20, seen in bottom plan in Fig. 3, and a metallic intermediate or cheek section 22, seen in bottom plan in Fig. 5. This intermediate section is of parquet construction and may, for example, be made up of three separate parts as indicated by the numbers 24, 26 and 28 in Fig. 5. Mold cavities 30 of the desired shape to form the intermediate portion 10 of the shock mounts, and in which the actual molding of this part occurs, are formed by registering formations in the adjoining edges of the three parts forming this intermediate section of the mold form. Each of these cavities is connected to a central recess 32 in the bottom side of the intermediate part 26 by diagonal recessed channels 34 extending from the central recess to the edge of the cavities, as indicated in Figs. 2 and 5. This construction is provided for receiving any excess of the material of the intermediate part of the shock mount during the processing operation, as will be explained. For convenience in handling, each of the sections 24, 26 and 28 is provided with a lug 36 suitably secured to opposite ends thereof, as by welding.

It will be noted in Figs. 1, 2 and 3 that the base plate 20 of the drag section is provided with lugs 38 on opposite ends thereof to facilitate handling of this plate and with vertical apertures 40 arranged to lie in axial alignment with the mold cavities defined between the parts 24, 26 and 28 forming the intermediate section of the mold form when the parts of the drag section are arranged in assembled relation. The apertures 40 receive the insets 14 which are to be bonded to one end of the shock mount, and the upper side of the base plate 20 is preferably countersunk or recessed concentrically with the apertures 40, as indicated at 42 in Fig. 2, to receive the heads on the inset 14 so that it is not necessary to provide other means for holding these insets in position while the mold form is being assembled or during a processing operation. In order to hold the parts forming the drag section properly aligned with respect to each other, a plurality of dowel pins 44 is preferably press-fitted into the base plate 20, as indicated in Figs. 2 and 3. These dowel pins project above the base plate and are received in registering openings in the parts 24, 26 and 28, and thus properly align these parts with each other and the base plate.

The part of the mold form thus far described is of more or less conventional construction, and in the conventional cope section, heretofore used when making shock mounts of the type shown in Fig. 7, clamps or other mechanical means had to be used to hold the upper insets 12 in the cope section while the mold form was being assembled and during the processing operation. The need for such devices has been eliminated in the improved cope section now to be described by establishing a magnetic potential difference between different regions of the cope section, and utilizing this to hold the insets in the section.

Referring to Figs. 1 and 2, it will be seen that the body of the improved cope section 18 is of laminated construction and includes a top plate 46 and a bottom or guide plate 48, the lower surface of the latter forming the parting surface of the mold form, which are spaced from each other by an intermediate plate 50. The three plates may be secured together by means of screws 58 which have heads that are countersunk in the guide plate 48, and a plurality of apertures 52, arranged to lie in axial alignment with the mold cavities 30 in the drag section when the two sections are assembled, are provided in the cope section for freely receiving the upper insets 12. The lower or parting surface of the plate 48 may be countersunk or recessed, as indicated at 54, to receive the heads of these insets so that the heads are held at the parting surface of the cope section. These apertures thus form guide means for insuring proper positioning of the inset 12 with respect to the mold cavities 30.

In order to establish a magnetic potential between the plates 46 and 48 in the cope section, by means of which displacement of the insets 12 from the apertures 52 is prevented while the mold form is being assembled or during a processing operation, these plates are formed from a magnetic material such as soft iron, while the intermediate plate 50 is of nonmagnetic material such as stainless steel so that it forms a magnetic barrier between the magnetic plates 46 and 48. A source of magnetic flux is provided by a permanent magnet 56, preferably of high coercive intensity. An alloy magnet composed of approximately 24% cobalt, 14% nickel, 8% aluminum, 3% copper, and the balance of iron, has been found to be particularly suitable for the relatively small mold form shown. A commercially available permanent magnet which approximates this composition and has been found suitable for use in these mold forms is known as Alnico V. This magnet is clamped between the plates 46 and 48 in an intermediate position with respect to the apertures 52 so that its opposite poles are coupled directly to these opposite magnetic plates and extends through an aperture 60 in the intermediate plate 52. Preferably the upper plate 46 is dished, as indicated at 62 in Fig. 2, so that the magnet is securely held in position with its center above the parting surface of the cope section.

Since the opposite poles of the magnet are in contacting engagement with the magnetic upper and lower plates 46 and 48, and these plates are separated by the nonmagnetic plate 50, a flux of opposite polarity will be established in the magnetic plates 46 and 48. It will be apparent that when insets which must be of magnetic material such as steel are positioned in the apertures 52, as indicated in Fig. 2, a flux path between the plates 46 and 48 will be established, through these insets. The lines of force have been indicated fragmentarily in Fig. 2 and when an Alnico or other relatively powerful magnet is used the flux will be of sufficient density to hold the insets 12 in position in the cope section, irrespective of the movement or the jarring which may occur when the mold is being assembled.

To insure proper alignment of the cope and drag sections, the cope section is provided with a plurality of dowel pins, one of which is indicated at 64 in Fig. 2, for registering in apertures in the drag section 16. It will also be noted that opposite ends of the intermediate plate 50 in the cope section project beyond the ends of the upper and lower plates, as indicated at 66 in Figs. 1 and 3. These projecting ends facilitate handling of the cope section when the mold form is being assembled or disassembled.

In performing a processing operation, the insets 14 are first inserted in the apertures 40 in the base plate 20 with the heads which are to be bonded to the intermediate portion 10 of the shock mounts resting in the recesses 42 and supporting the insets in the apertures. The intermediate section of the mold form comprising the parts 24, 26 and 28 is then arranged upon base plate 20 and plugs or pellets of the material of which the intermediate part 10 of the shock mount is to be formed are forced into the mold cavities 30. After the insets 12 for the upper end of the shock mount have been inserted in the apertures 52 in the cope section, the latter is mounted to the drag section. Since the permanent magnet 56 maintains a constant magnetic potential between the plates 46 and 48, the operator need merely insert the insets 12 in the guiding apertures 52, and thereafter the magnetic flux through the insets will snap them into place and prevent displacement of the same while the mold is being assembled and during the processing operation. When the two sections of the mold form have been assembled, it is ready for the application of heat which molds the intermediate part to its final shape and effects the bonding of the insets to this intermediate part. If an excess of material is present in the mold cavities, it will pass out through the diagonal channels 34 into the recess 32 in part 26.

While a small mold form suitable for making four shock mounts at one time has been described, it is to be understood that the principles of the invention are not limited to mold forms of this size but may be applied for making mold forms as large as desired. However, since the range of effectiveness of a single magnet is limited, it may be necessary in larger molds to arrange the mold cavities along with the inset guiding apertures in groups and place a magnet intermediately with respect to each group.

From the above description of a single embodiment of the invention it will be apparent that it has numerous advantages. A mold form constructed as described is always ready for use and eliminates the need for special clamping or holding devices and the trouble and error which such devices often entail. Since it is necessary for the operator merely to insert the insets in the guiding apertures no adjusting or special manipulation by the operator is necessary so that the mold is more convenient and accurate in use. Furthermore the simplicity of the invention does not complicate the mold or die design but on the contrary permits greater flexibility in design since the need for mechanical holding devices is eliminated. In addition the invention may be provided without adding substantially to the cost of a mold form without holding devices, and by using an Alnico magnet, as suggested, the mold may be subjected to temperatures up to 1,000° F. without substantially diminishing the holding power of the magnet.

While the invention has been described as applied to a mold form for shock mounts, it will be apparent that it is susceptible to use in mold forms for making a wide variety of articles having insets of magnetic material. It will also be apparent that numerous variations and modifications may be made in the construction described without departing from the underlying principles of the invention. I, therefore, desire by the following claims to include within the scope of the invention all such variations and modifications by which substantially the results of the invention may be obtained through the use of substantially the same or equivalent means.

I claim:

1. In a mold section for a mold or die form for use in producing articles to which insets of a magnetic material are bonded, the combination comprising, a body, one side of which forms the parting surface for the mold section, said body including magnetic and nonmagnetic portions arranged to establish a magnetic potential between different regions of the body when a magnetic flux is applied thereto, means for producing a magnetic flux in said body, and guide means in said body comprising one or more apertures for freely receiving said insets with the portion thereof to be bonded at said parting surface, said insets seated in said apertures forming flux paths between the regions of magnetic potential in said body.

2. In a mold section for a mold or die form for use in producing articles to which insets of a magnetic material are bonded, the combination comprising a laminated body structure including magnetic and nonmagnetic body members arranged in stacked relation to provide an intermediate magnetic barrier, one side of said body structure forming a parting surface for the mold section, guide means in said body structure for positioning said insets for a processing operation comprising one or more apertures in said body members adapted freely to receive said insets with the ends thereof to be bonded at said parting surface and the opposite ends projecting through said magnetic barrier to form flux paths therethrough, and a source of magnetic flux for establishing a flux through the insets in said guide means to hold the insets against displacement during a processing operation.

3. In a mold section for a mold or die form for use in producing articles to which insets of a magnetic material are bonded, the combination comprising a magnetic body structure, one side of which forms the parting surface for the section, and including a nonmagnetic barrier, guide means for positioning said insets for a processing operation comprising one or more apertures in said body structure adapted freely to receive said magnetic insets with the ends thereof to be bonded at said parting surface and the opposite ends projecting into said barrier, and means for establishing a magnetic flux through the insets in said guide means for holding the insets against displacement during a processing operation including said magnetic barrier, and a source of magnetic flux for establishing a flux of opposite polarity on opposite sides of said barrier.

4. A mold section as defined in claim 3, wherein the source of magnetic flux is a permanent magnet intermediately positioned with respect to said inset guiding apertures.

5. A mold section as defined in claim 3, wherein said body structure includes body members of magnetic material spaced by said nonmagnetic barrier which is contiguous and substantially coextensive therewith, and said source of magnetic flux is a permanent magnet which projects through said nonmagnetic barrier and has its opposite poles directly coupled to the opposite spaced magnetic body members.

6. A mold section as defined in claim 3, wherein the apertures for receiving said insets are arranged in groups and said source of magnetic flux comprises a plurality of permanent magnets, one of which is spaced intermediate each of the groups of inset receiving apertures.

7. A mold section for a mold or die form for use in producing articles to which insets of a magnetic material are bonded comprising spaced magnetic plates, a nonmagnetic plate interposed between the spaced plates to form a magnetic barrier therebetween, said plates having one or more aligned apertures extending therethrough for freely receiving insets to position the same for a processing operation, and a permanent magnet positioned intermediate said apertures with its opposite poles directly coupled to the opposite magnetic plates, said magnet and plates cooperating to establish a flux through the insets positioned in said apertures for preventing displacement of the insets during a processing operation.

8. In a mold or die form for the production of finished articles to which insets of magnetic material are bonded, the combination comprising a drag section having one or more mold cavities formed therein and a cope section adapted to be assembled with said drag section to form a complete mold form, said cope section including magnetic and nonmagnetic body members arranged in stacked relation to provide an intermediate nonmagnetic barrier, guide means in said cope section for positioning said insets to register with said cavities when the sections are assembled, comprising aligned apertures in said body members adapted freely to receive said insets with one end thereof positioned for bonding and another portion projecting into said nonmagnetic barrier to form flux paths therethrough, and means for establishing a magnetic flux through the insets in said guide means for holding the insets against displacement during assembly of the mold form and the processing operation including said magnetic and nonmagnetic body members and a source of magnetic flux for establishing a flux of opposite polarity on opposite sides of said nonmagnetic barrier.

9. A mold form as defined in claim 8, having a cope section wherein magnetic body members are arranged on either side of said nonmagnetic body member and said source of magnetic flux is a permanent magnet which projects through said nonmagnetic body member and has its opposite poles directly coupled to the opposite spaced magnetic body members.

10. In a mold or die form for the production of finished articles to which insets of a magnetic material are bonded, the combination comprising, a drag section having one or more mold cavities formed therein, and a cope section including magnetic plates, one of which forms the parting surface of said cope section, and a nonmagnetic plate interposed between said magnetic plates to form a nonmagnetic barrier therebetween, said cope section having apertures for receiving insets with the part to be bonded at said parting surface and another part projecting through said magnetic barrier, said apertures being arranged to position the insets for registering with the mold cavities in said drag section when the sections are assembled, and means for establishing a magnetic flux through the insets in said apertures for holding the insets against displacement during assembly of the mold form and the processing operation including said nonmagnetic plate and a permanent magnet intermediately positioned with respect to said apertures and clamped between the opposite magnetic plates to establish a flux of opposite polarity in the opposite magnetic plates.

11. In a mold or die form for the production of finished articles which include insets of a magnetic material bonded to opposite ends of the finished article, the combination comprising, a drag section including a base having a series of apertures adapted to receive and support the insets for one end of said article, a cheek section adapted to be received on said base and having a plurality of mold cavities formed therein arranged to register with the apertures in said base, a cope section including magnetic plates, one of which forms the parting surface of said cope section, and a nonmagnetic plate interposed between said magnetic plates to form a nonmagnetic barrier therebetween, said cope section having apertures for receiving the insets for the opposite end of said articles with the part to be bonded at said parting surface and another part projecting through said magnetic barrier, said apertures being arranged to register with said mold cavities when the sections are assembled, and means for establishing a magnetic flux through the insets in said apertures for holding the insets against displacement during assembly of the mold form and a processing operation including said nonmagnetic plate and a permanent magnet intermediately positioned with respect to said apertures and clamped between the opposite magnetic plates to establish a flux of opposite polarity in the opposite magnetic plates.

FRANK A. RYDER.

No references cited.